Sept. 8, 1942.  B. E. LENEHAN  2,295,349
TWO-RATE INSTRUMENT
Filed Oct. 21, 1938
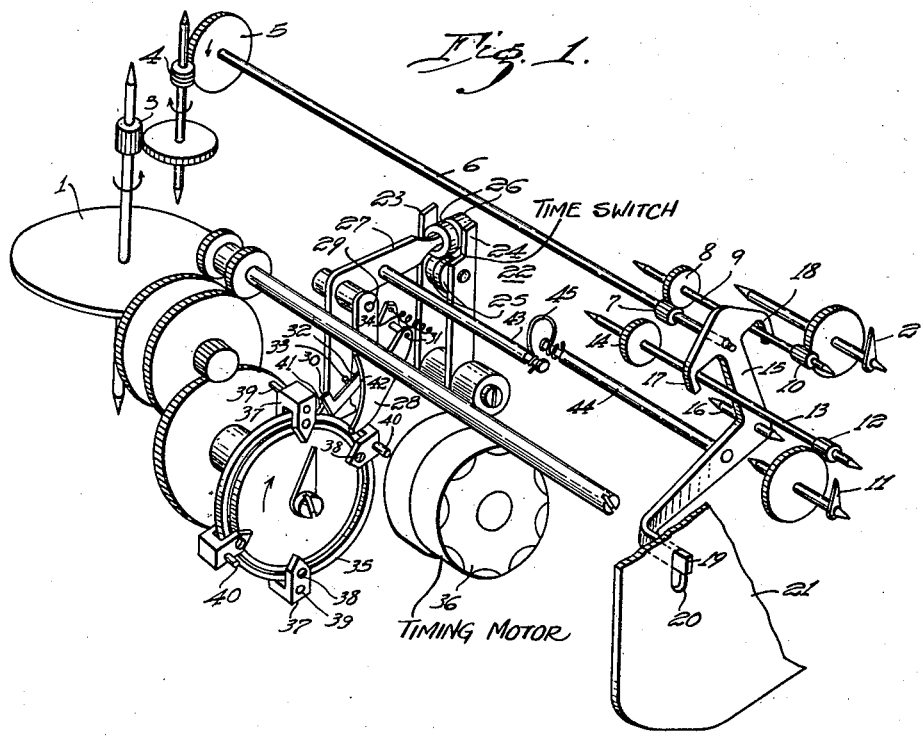
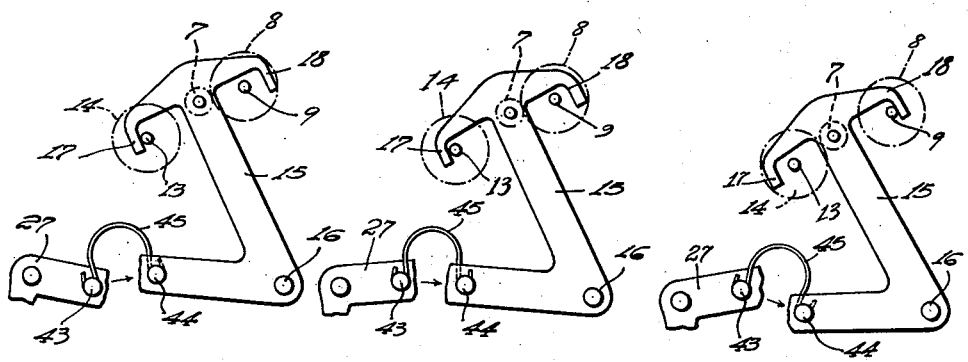
WITNESSES:
INVENTOR
Bernard E. Lenehan.
BY
ATTORNEY Patented Sept. 8, 1942

2,295,349

UNITED STATES PATENT OFFICE 2,295,349

TWO-RATE INSTRUMENT

Bernard E. Lenehan, Bloomfield, N. J., assignor to Westinghouse Electric & Manufacturing Company, East Pittsburgh, Pa., a corporation of Pennsylvania Application October 21, 1938, Serial No. 236,203

6 Claims. (Cl. 171—268)

This invention relates to instruments, and it has particular relation to instruments of the two-rate meter type.

Certain apparatus is provided with a plurality of driven elements which are selectively coupled to a driving source. As an example of a specific device of this class, reference may be made to a two-rate meter which has a well recognized place in the meter art. A two-rate meter comprises a pair of registers which may be selectively coupled to an instrument movement, which usually is of the induction watthour meter type. As ordinarily employed, one of the registers, herein termed a low-rate register, is coupled to the movement during those periods in which the demand upon the generating station is relatively light or slack, and the remaining register, which may be termed a high-rate register, is coupled to the movement during the remainder of the operating time. By charging the consumer a lower rate for electrical energy consumed during the slack periods, the use of electricity during such periods with the resultant tendency to even the load demands on the generating station is encouraged.

In the prior art registers, some difficulties were experienced from inaccuracies in the register readings at the end of a billing period. Many of these inaccuracies may be traced to the effect of vibration on the registers. In meters of this type, only one register is in operation at any time, the remaining register being idle. Principally due to vibration, the idle register tends to rotate with a resultant inaccuracy. In view of the fact that the direction of rotation under the influence of vibration is in the same direction over a billing period, the errors due to vibration are cumulative over a billing period. It is possible to eliminate movement of the idle register by providing both of the registers with friction clutches, but this solution is unsatisfactory. For the greatest economy of operation and the greatest service, it is desirable that instrument movements of the type ordinarily employed in two-rate registers be loaded as lightly as possible. When friction clutches are employed, the friction clutch remains in engagement with each register even when the register is connected to the instrument movement and imposes an added drag on the instrument movement.

In accordance with my invention, instruments of the two-rate meter type are provided with selective braking means which are actuated simultaneously with actuation of the coupling means. That is, when the coupling is moved from the low-rate to the high-rate register, the braking means simultaneously is moved from the high-rate to the low-rate register. With such an arrangement, the driven register is substantially unbraked during operation and substantially no increase in load is provided for the instrument movement.

It is, therefore, an object of my invention to provide a plurality of driven elements with means for selectively coupling either of said elements to a driving source and means for selectively braking the uncoupled element.

It is a further object of my invention to provide a two-rate instrument having a pair of registers with a pinion movable for driving either of the registers and braking means for engaging the undriven register.

Other objects of my invention will be apparent from the following description taken in conjunction with the accompanying drawing, in which:

Figure 1 is a view in perspective with parts omitted and parts broken away of an instrument embodying my invention; and Figs. 2, 3 and 4 are detailed views showing various positions of the braking and coupling means employed in the instrument of Fig. 1.

Referring to the drawing, Fig. 1 shows an instrument movement which may be of the induction watthour meter type as represented by a disc or armature 1 which is coupled to a register 2 through gears 3, a worm 4, worm wheel 5, shaft 6, pinion 7, gear 8, shaft 9 and pinion 10. The register 2 although represented by a single indicating pointer, may be of any conventional type and may include a plurality of pointers and coacting dials such as are found in the usual integrating register.

In order to provide a record of electricity consumed during slack periods, a second register 11 is provided which may correspond to the register 2 in design. This register 11 is driven through a pinion 12, a shaft 13 and a gear 14 which is positioned adjacent to the gear 8 employed for driving the register 2.

Selective operation of the registers is provided by mounting one end of the shaft 6 in a bearing carried by one arm of a bell crank 15 which is mounted for rotation on a shaft 16. By proper movement of the bell crank 15 about its shaft 16, the pinion 7 may be carried from its engagement with the gear 8 into engagement with the gear 14 for driving the register 11 without sufficient movement being imparted to the worm wheel 5 to cause it to lose its meshing engagement with the worm 4.

For braking purposes two depending arms 17 and 18 are formed on the lever 15 for engaging either of the shafts 9 or 13, the arms 17 and 18 being spaced apart a distance slightly greater than the spacing of the shafts. As shown in Fig. 1, the pinion 7 is in engagement with the gear 8 and the arm 17 is in engagement with the shaft 13 for preventing rotation of the shaft 13 and the attached register 11 under the influence of vibration, or for any other reason. The arm 17 may be so positioned that it acts as a stop for the pinion 7, engagement of the arm 17 with the shaft 13 determining proper meshing engagement for the pinion 7 with the gear 8. When the lever 15 is rotated counter-clockwise, as viewed in Fig. 1, the arm 17 is carried out of braking engagement with the shaft 13, and the arm 18 is carried into braking engagement with the shaft 9 for preventing rotation of the shaft 9 and register 2 under the influence of vibration. At the same time, the pinion 7 is carried out of meshing engagement with the gear 8 into meshing engagement with the gear 14 for driving the low-rate register 11. Here also the arm 18 may operate as a stop for determining the proper meshing engagement of the pinion 7 with the gear 14.

If desired, the bell crank 15 may be provided with a bent end 19 which is positioned in a slot 20 formed in a face plate 21. The position of the end 19 in the slot indicates which of the registers is coupled to the instrument movement, and suitable indicia may be provided on the face plate 21 for indicating this position of the pinion 7.

Automatic engagement of the pinion 7 with the appropriate register at desired intervals may be provided by including in the instrument assembly a suitable timing device. In the specific embodiment illustrated in Fig. 1, a timing device is employed for actuating a switch 22 which is employed for connecting certain apparatus, such as hot water heaters to a power line through the meter during slack periods. Conveniently this switch may include two spring leaves 23 and 24 which carry switch contacts 25. The switch is actuated by means of a pair of spacing rollers 26 which are inserted into and removed from engagement with the spring leaves 23, 24 by means of a supporting bell crank 27. When the spacer rollers are in the position illustrated, the contacts 25 are separated, and the apparatus such as the hot water heater referred to, is disconnected from the power line. When the bell crank 27 is rotated in a counter-clockwise direction, as viewed in Fig. 1, the spacing rollers 26 are removed from between the spring leaves 23, 24 and these leaves under the influence of their own resiliency, bring the contacts 25 into engagement, thereby connecting the controlled apparatus to the power line. For operating the bell crank 27 a closing lever 28 is pivotally mounted for rotation about the axis 29 of the bell crank and a latching lever 30 is mounted for rotation on a pin 31 carried by the closing lever 28. In the position illustrated, the bell crank 27 is retained in its switch opening position by means of a lug 32 on the latching lever which is forced against the pin 33 carried by the bell crank 27 under the influence of a spring 34.

The switch 22 is closed and opened at predetermined intervals by means of a timing disc 35 which is rotated at a suitable rate such as one revolution in 24 hours, by means of a synchronous motor 36 or suitable clockwork mechanism through appropriate gearing. Adjustably mounted around the periphery of the disc 35 are a plurality of blocks 37 which may be retained in any adjusted position by means of set screws 38. Certain of these blocks carry switch closing pins 39 while others of these blocks carry switch opening pins 40.

The operation of the timing units may be reviewed briefly as follows. As the disc 35 rotates in the direction of the arrow, a switch closing pin 39 engages the latching lever 30 and rotates the lever sufficiently to withdraw the lug 32 from engagement with the pin 33. Further rotation of the pin 39 carries it into engagement with a cam portion 41 of the bell crank 27 to force the bell crank in a counter-clockwise position, as viewed in Fig. 1, until the rollers reach the ends of the spring leaves 23, 24 at which point the resiliency of the spring leaves assists the ejection of the rollers. The switch now is in a closed position and connects the water heaters or other apparatus controlled thereby to the power line. By suitable adjustment of the block supporting the opening pin 39, this closing of the switch may be effected at any predetermined time. On continued rotation of the timing disc, a switch opening pin 40 engages a cam surface 42 on the closing lever 28 and moves the lever 28 in a counter-clockwise direction, carrying with it the latching lever 30 against the resistance of the spring 34 until the lug 32 once more is in a position to engage the pin 33. When the switch opening pin 40 passes beyond the lever 28, the spring 34 urges the latching lever against the pin 33 and thereby forces the bell crank 27 in a clockwise direction to reintroduce the rollers 26 between the spring leaves 23, 24. The switch mechanism then is restored to the position illustrated in Fig. 1. A description of a similar switch unit is presented in my copending application, Serial No. 71,432, filed March 28, 1936, which has issued as Patent 2,217,414.

Operation of the switch mechanism also is employed for automatically operating the pinion 7 and the braking arms 17, 18. For this purpose the bell cranks 27 and 15 are provided, respectively, with pins 43 and 44 which have overlapping ends. These ends are coupled by means of a U-shaped spring 45 which is under a stress tending to separate the pins 43, 44. Movement of the bell crank 27 to close and open the switch 22 rotates the bell crank 15 in a counter-clockwise or clockwise direction, as will be apparent from a study of Figs. 2, 3 and 4.

Referring to Fig. 2, the bell cranks 27 and 15 are shown in the positions they occupy in Fig. 1. In this position it will be noted that the pin 43 is below the plane containing the pin 44 and the shaft 16. Consequently, the force applied by the spring 45 to the pin 44 is in the direction shown by the arrow, and the line of action of this force passes above the shaft 16, thereby tending to rotate the bell crank 15 in a clockwise direction. Consequently, with the parts in the positions shown in Fig. 2, the spring 45 tends to bias the braking arm 17 against the shaft 13 and to retain the pinion 7 in mesh with the gear 8. This relationship is such that the instrument disc actuates the high-rate register 2 while the low-rate register 11 is restrained against movement by the braking arm 17.

When the bell crank 27 is rotated in a counter-clockwise direction to close the switch, the pin 43 moves upwardly until it reaches the position shown in Fig. 3, wherein it is in the plane containing the pin 44 and the shaft 16. In this position, the force exerted by the spring 45 on the pin 44, as shown by the arrow, intersects the shaft 16, and consequently the pin is in an unstable position. As the bell crank 27 continues to rotate in a counter-clockwise direction, the pin 43 is carried above the plane containing the pin 44 and the shaft 16, as shown more particularly in Fig. 4. Under these circumstances, the force exerted by the spring 45 on the pin 44, as shown by the arrow, is in a line passing below the shaft 16 and thereby tends to rotate the bell crank 15 in a counter-clockwise direction. This rotation carries the braking arm 18 against the shaft 9 and consequently carries the pinion 7 into engagement with the gear 14. Thus when the bell crank 27 has moved to close the switch, the instrument movement disc will be connected through the pinion 7 to the low-rate register 11, whereas the high-rate register 2 will be braked by the arm 18, as indicated in Fig. 4. When the bell crank lever 27 is rotated in a clockwise direction to open the switch, the pin 43 moves below the plane containing the pin 44 and the shaft 16, and the force exerted by the spring 45 is in a direction such that the parts are restored to the position shown in Figs. 1 and 2.

Because the action of the spring 45 is a snap action, the pinion 7 is moved promptly from one register to the other. Consequently, registration of power is interrupted for an insignificant time. Moreover, the action of the spring 45 is such that the braking arms 17, 18 and the pinion 7 are held resiliently in their proper positions. A spring operating in the manner of the spring 45 is termed an "over-center" spring.

Although I have described my invention with reference to a specific embodiment thereof, it is obvious that many modifications are possible. Therefore, I do not wish my invention to be restricted except as required by the appended claims when interpreted in view of the prior art.

I claim as my invention:

1. In a plural rate measuring instrument having register driving means and a pair of registers, control means for said registers including a controlled device mounted for rotation about an axis between two predetermined positions, a stressed spring having a first portion engaging said controlled device at a point displaced from said axis, means for moving a second portion of said spring between two positions on opposite sides of a plane containing said axis and said point for selectively actuating said controlled device into either of its predetermined positions, coupling means responsive to the position of said controlled device for selectively coupling either of said registers to said register driving means, and means for preventing operation of the uncoupled one of said registers, said last-named means also being designed as stop means for establishing proper coupling of said coupling means.

2. In a measuring instrument, a pair of registers, means for actuating said registers, selecting means operable between two positions for selectively coupling said actuating means to either of said registers, an electric switch assembly including an electric switch movable between a closed condition and an open condition, and including means for opening and closing said switch, and operating means responsive to movement of said switch between its two conditions for operating said selecting means, said operating means including a snap action device interposed between said switch assembly and said selecting means for snapping said selecting means rapidly from either one of said positions to the other of said positions in response to movement of said switch.

3. In a measuring instrument, a pair of registers, means for actuating said registers, selecting means operable between two positions for selectively coupling said actuating means to either of said registers, an electric switch assembly including an electric switch movable between a closed condition and an open condition, and including means for opening and closing said switch, operating means responsive to movement of said switch between its two conditions for operating said selecting means, said operating means including a snap action device interposed between said switch and said selecting means for snapping said selecting means rapidly from either one of said positions to the other of said positions, and positioning means for accurately positioning said selecting means in either of said two positions, said positioning means also being designed for inhibiting operation of the uncoupled one of said registers.

4. In a measuring instrument, a pair of independent translating means each having a rotatable operating assembly including a shaft and a gear, said shafts being parallel, a supporting structure capable of maintaining the spacing between parts thereof, means mounting said supporting structure for movement into selective braking engagement with either of said shafts for inhibiting rotation of the braked assembly, gear means associated with said supporting structure for relative movement therewith into selective engagement with the gear associated with the unbraked one of said assemblies, the dimensions of said supporting structure serving to position accurately said gear means relative to said assemblies, and actuating means associated with said gear means for rotating the gear selected by said gear means.

5. In a measuring instrument, a pair of independent translating means each having a rotatable operating assembly including a shaft and a gear, said shafts being parallel, a supporting structure capable of maintaining the spacing between parts thereof, means mounting said supporting structure for movement into selective braking engagement with either of said assemblies for inhibiting rotation of the braked assembly, gear means associated with said supporting structure for relative movement therewith into selective engagement with the gear associated with the unbraked one of said assemblies, the dimensions of said supporting structure serving to position accurately said gear means relative to said assemblies, actuating means associated with said gear means for rotating the gear selected by said gear means, an electrical switch movable between an open condition and a closed condition, means for moving said electrical switch between said conditions, and means including a snap action device mechanically connected to said switch and responsive to movement of said switch for effecting said relative movement of said supporting structure with a snap action into selective engagement with either of said assemblies.

6. In a measuring instrument, a pair of independent translating means each having a rotatable operating assembly including a shaft and a gear, said shafts being parallel, a supporting structure capable of maintaining the spacing between parts thereof, means mounting said supporting structure for rotation into selective braking engagement with either of said shafts for inhibiting rotation of the braked assembly, gear means associated with said supporting structure for relative movement therewith into selective engagement with the gear associated with the unbraked one of said assemblies, the dimensions of said supporting structure serving to position accurately said gear means relative to said assemblies, actuating means associated with said gear means for rotating the gear selected by said gear means, an electrical switch movable between an open condition and a closed condition, means for moving said electrical switch between said conditions, and means including a snap action device responsive to movement of said switch for effecting said relative movement of said supporting structure with a snap action into selective engagement with either of said assemblies, said last-named means comprising a spring having a portion connected to said supporting structure at a point displaced from the axis of rotation thereof, and means mechanically connected to said switch and responsive to movement of said switch for moving a second portion of said spring from a position on a first side of a plane containing said point and said axis to the second side of said plane.

BERNARD E. LENEHAN.